United States Patent
Gulati et al.

(10) Patent No.: US 6,865,624 B2
(45) Date of Patent: Mar. 8, 2005

(54) METHOD AND APPARATUS FOR PROCESSING CALLS ON A MULTIPROCESSOR COMMUNICATION SYSTEM

(75) Inventors: Neeraj Gulati, Cupertino, CA (US); Jeffrey Gullicksen, Santa Clara, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/351,272

(22) Filed: Jan. 24, 2003

(65) Prior Publication Data

US 2003/0172105 A1 Sep. 11, 2003

Related U.S. Application Data

(63) Continuation of application No. 09/427,711, filed on Oct. 27, 1999, now Pat. No. 6,542,942.

(51) Int. Cl.[7] ............................................. G06F 13/28
(52) U.S. Cl. ........................... 710/31; 710/29; 709/229
(58) Field of Search ........................... 710/31, 29, 12; 709/229; 370/351; 379/1.01

(56) References Cited

U.S. PATENT DOCUMENTS

| | | | | |
|---|---|---|---|---|
| 4,974,256 A | * | 11/1990 | Cyr et al. | 379/112.04 |
| 5,239,539 A | | 8/1993 | Uchida et al. | 370/398 |
| 5,283,897 A | * | 2/1994 | Georgiadis et al. | 709/105 |
| 5,655,120 A | * | 8/1997 | Witte et al. | 709/105 |
| 5,940,491 A | | 8/1999 | Anderson et al. | 370/351 |
| 6,147,994 A | * | 11/2000 | Duree et al. | 370/392 |
| 6,345,317 B1 | | 2/2002 | Takeda | 710/12 |
| 6,353,847 B1 | | 3/2002 | Maruyama | 707/10 |
| 6,563,918 B1 | * | 5/2003 | Nelson et al. | 379/230 |
| 6,754,224 B1 | * | 6/2004 | Murphy | 370/432 |

* cited by examiner

*Primary Examiner*—Kim Huynh
*Assistant Examiner*—Harold Kim (57) ABSTRACT

A call made with a communication device is processed using multiple call processors (CPs) operatively connected to a network. CPs use processing load information from other CPs to select which CP will handle call set up when the call is requested. A similar selection process is used for selecting one of CPs to perform other call processing functions and to terminate the call upon receiving a request to terminate the call. The CP selected to set up a call, tear-down a call or perform other call processing depends on the load associated with the processor and the load associated with setting up, tearing down performing other call processing for the call.

20 Claims, 7 Drawing Sheets

| Line Card 1 | | | |
|---|---|---|---|
| CP | Process Load | Incremental Increase | Activity Level Metric |
| 1 | 5 | 3 | 15 |
| 2 | 10 | 1 | 10 |
| 3 | 100 | 2 | 200 |
| 4 | 5 | 1 | 5 |
| . | . | . | . |
| . | . | . | . |
| . | . | . | . |

FIG. 7

METHOD AND APPARATUS FOR PROCESSING CALLS ON A MULTIPROCESSOR COMMUNICATION SYSTEM

CROSS-REFERENCE TO RELATED APPLICATIONS

This application is a continuation of U.S. Ser. No. 09/427,711, filed Oct. 27, 1999, now U.S. Pat. No. 6,542,942, which is incorporated herein by reference.

TECHNICAL FIELD

The present invention generally relates to communications and, more particularly, to a method and apparatus for processing calls on a multiprocessor communication system.

BACKGROUND OF THE INVENTION

In a communication system, call processing facilitates connectivity between two or more communication devices on a network. These communication devices include conventional phones, video-phones, or other types of devices that carry audio and/or video information. Initially, call processing uses a call setup process to allocate communication resources to be used by the communication devices when communicating over a network. For example, this may include allocating bandwidth and storage buffers on the system to be used by different communication devices to use during voice or data communication. A call tear-down process breaks the communication connection between the communication devices and reallocates the communication resources back to the system once the communication is completed.

Some communication networks use a call processor (CP) to perform the call setup and call tear-down processes. On larger networks multiple CPs handle the call setup and tear down processes. These CPs use signaling to communicate with the communication devices during the call setup and call tear-down processes.

In conventional systems CPs are statically associated with the particular communication devices throughout the call setup and tear down process. The association between a communication device and a CP remains constant even when call patterns change within the network. Unfortunately, calls often overload the network because several CPs become overloaded, even though other CPs are available to process calls. For example, increased communication activity on one part of the network may overload a single CP with call processing tasks while another CP on the network remains idle waiting for communication activity. Accordingly, it is desirable to implement methods and apparatus for processing communications on a multiprocessor network that prevent, or at least minimize the number of, processors that become overloaded.

SUMMARY OF THE INVENTION

A method consistent with this invention, for use in a network having multiple, processors, of processing a call between communication devices includes selecting one of the multiple processors to setup the call when the call is requested, setting up the call using the selected processor, transferring information between the communication devices, and terminating the call upon receiving an appropriate request. Means for carrying out this method are also provided.

An apparatus consistent with this invention for processing a call between communication devices over a network includes a plurality of processors, each including memory containing instructions. The processors execute instructions and, when the call is requested, select one of the processors to set up the call, the selected one of the processors executing instructions thereby setting up the call. During the call, the processor transfers information between the communication devices. The plurality of processors also select one of the processors to terminate the call upon receiving an appropriate request.

A computer program product consistent with this invention for execution by a processor capable of processing a call between communication devices over a network including multiple processors includes program code capable of selecting a processor to set up the call when the call is requested, setting up the call using the selected processor, transferring information between the communication devices, and selecting a processor to terminate the call when call termination is requested.

A network consistent with this invention for use with communication devices for exchanging information over the network includes line cards operatively connected to the communication devices and the network to facilitate the exchange of information, and multiple call processors operatively connected to the network and the line cards, wherein each call processor is capable of determining which one of the multiple processors should be used to set up a call and which one of the multiple processors should be used to tear down the calls. In one embodiment, the determination of which processor should be used for setting up or tearing down calls is made based on relative activity levels of the processors.

The above desires, other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE PREFERRED EMBODIMENTS

Reference will now be made in detail to systems, methods, and apparatus, consistent with the present invention, that are illustrated in the accompanying drawings. Wherever possible, the same reference numbers in different figures refers to the same or like parts.

Figure 1:
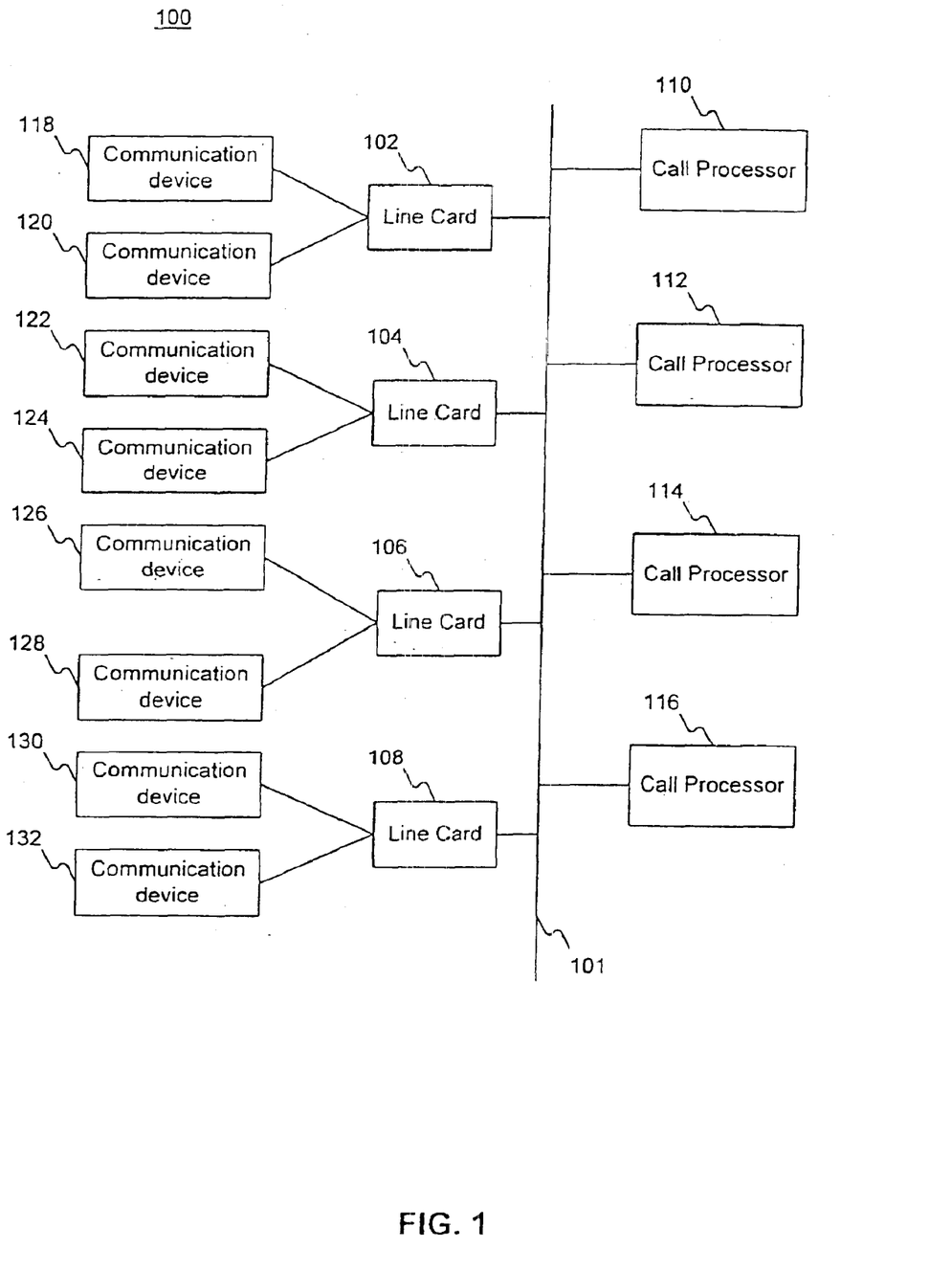
FIG. 1 is a network consistent with the invention.

FIG. 1 is an embodiment of a communication network, consistent with this invention, including communication devices, line cards, and call processors (CP's). Specifically, network system 100 includes a line card 102, a line card 104, a line card 106, and a line card 108 operatively connected to a network line 101, such as a switch. Each line card facilitates multiplexing and demultiplexing information between communication devices. Switching equipment such as call processors (CP) 110–116 facilitate setting up and tearing down calls made between the communication devices.

Communication devices 118–132 are connected to network line 101 via line cards 102, 104, 106, and 108, and represent any device used to transmit information. These devices may include any type of device for communicating information, including conventional telephones, wireless telephones, or combination audio-video phones used to transmit audio and visual images over the network, to name a few. The connection may be implemented by a physical switch between two or more communication devices or may be by a virtual switched communication link between devices implemented using a high-speed packet network and protocol. Although two communication devices (e.g., 118, 120) are shown connected to each line card (e.g., 102), it is to be understood that any number of such devices may be so connected without departing from the scope of the present inventions.

Line cards 102, 104, 106, and 108 facilitate transfer of signals from multiple communication devices for transmission over network 101. For example, the line cards may multiplex and demultiplex pulse code modulated (PCM) information transmitted on network line 101. CP's 110, 112, 114, and 116 communicate with the line cards to determine communication paths between line cards 102–108 and communication devices 118–132. A CP selection method, consistent with this invention, selects CP's suitable for setting up calls, tearing down calls and performing other call processing functions between communication devices depending on the call processing load of each CP in network system 100.

Figure 2:
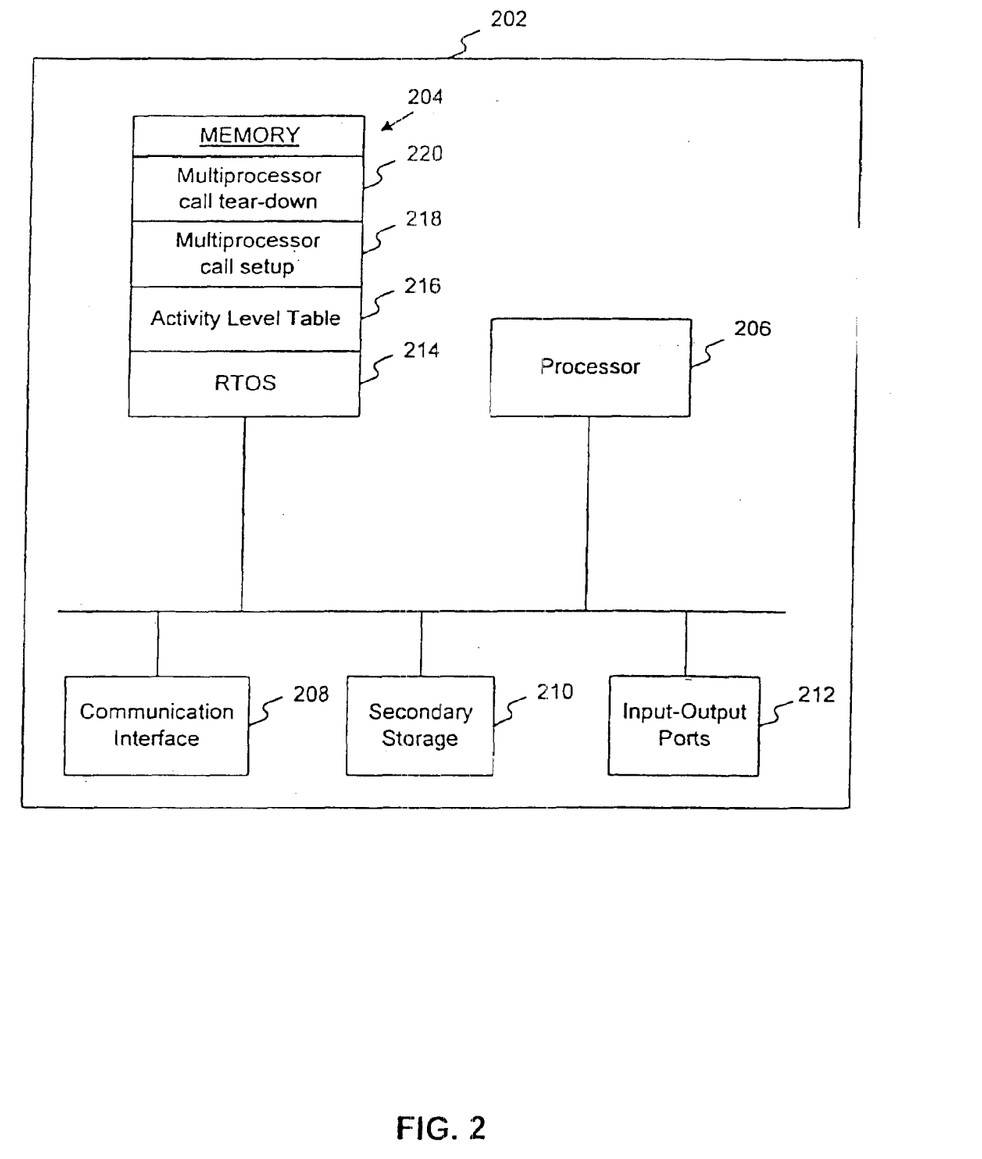
FIG. 2 is a block diagram of components in a call processor, consistent with the invention, having multiprocessor call setup, multiprocessor call tear-down and activity level table modules for communication over a network.

FIG. 2 is a block diagram of one embodiment of a CP consistent with the present inventions. Other embodiments are of course possible. In particular, CP 202 includes a memory 204, a processor 206, a communication interface 208, secondary storage 210, and input-output ports 212 connected as shown to network line 201. Communication interface 208 may implement any type of communication protocol, such is asynchronous transfer mode (ATM), Fiber Distributed Data Interface (FDDI), Copper Distributed Data Interface (CDDI), or other protocols. CDDI is the implementation of FDDI protocols over shielded twisted pair (STP) and unshielded twisted pair (UTP) cabling. Secondary storage 210 can be, for example, a hard disk or other permanent storage device capable of storing information used in processing information on CP 202. Input/output ports 212 may include any type of port, such as serial ports or parallel ports, for communication with a peripheral, such as a console, keyboard, mouse, or printer device. Other components not specifically included herein may also be used for different implementations of this invention without departing from the principles of the invention.

Memory 204 includes a real-time operating system (RTOS) 214, an activity level table 216, a multiprocessor call setup module 218, and a multiprocessor call tear-down module 220. Processor 206 executes programs in memory 204 to perform the connecting defined in the programs. Herein, the discussion of the invention will be stated in terms of the programs of memory 204 performing particular functions, but it should be understood that the functions are actually performed by processor 206 when executing the programs of memory 204.

RTOS 214 manages resources such as memory 204, secondary storage 210, and allocates bandwidth through communication interface 208. Although a general-purpose operating system may be used in lieu of RTOS 314, this may degrade overall performance.

Activity level table 216 stores information defining the processing load on respective call processors connected to network 101. Load information may be used in selecting a CP to process a call. In operation, each CP monitors its load and broadcasts its respective load information over network line 101 for storage in the activity level table 216 of each CP. A selection method consistent with this invention uses this load information to select CP's for setting up, processing and tearing down a call, as described below.

Call setup module 218 receives requests from a communication device to set up a call on network 101 between two or more communication devices. Call setup module 218 uses activity level table 216 to compare the load on that CP (CP 202 for example) with other CP's on network 101. A selection technique consistent with this invention is then used to select an appropriate CP to setup the call.

Call tear-down module 220 terminates calls and releases resources used in making the call. In one embodiment, the same CP that sets up a call also tears down the call using call tear-down module 220. Alternatively, however, a different CP on network 101 may terminate the call and manage the deallocation of network resources for the call. In this type of embodiment, call tear-down module 220 checks information in activity level table 216 to determine an appropriate CP for handling the call tear-down. Thus, depending on this analysis, tearing down the call may be assigned to a different CP.

Redistributing call tear-down helps balance the process load when a large number of calls are terminated simultaneously. For example, terminating a conference call involving hundreds of phone devices can overload a CP initially assigned to tear-down the numerous calls. In turn, the overload in tearing down calls may delay processing other calls, thus frustrating people attempting to place new calls. Redistribution of call tear-down to other CP's makes the tear-down process more efficient and helps distribute the impact on processing calls.

Figure 3:
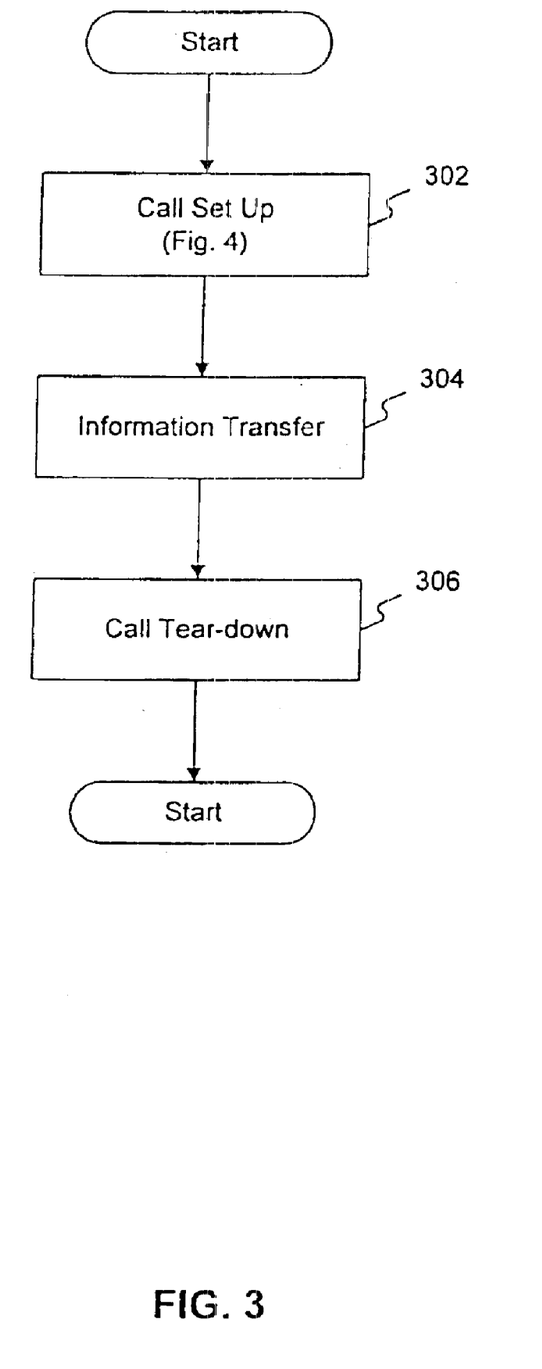
FIG. 3 is a flow chart showing the overall steps of processing a call on a network consistent with the present invention.

FIG. 3 is a flow chart illustrating the steps of processing a call on network system 100. Call set up (step 302) involves placing a call between two or more communication devices on a network. To perform call set up, a communication device makes a call set up request. In response to the request, a CP is selected to handle the call set up. The selected CP reserves bandwidth on the network line 101 for the communication devices to transmit data or information. Once the call has been set up, and assuming the called communication device responds, the CP transfers data, voice, or a combination of data and voice information (step 304) between the communication devices. At the end of the call, the call set up CP (or another CP) tears the call down and deallocates the resources used in making the call (step 306).

Figure 4:
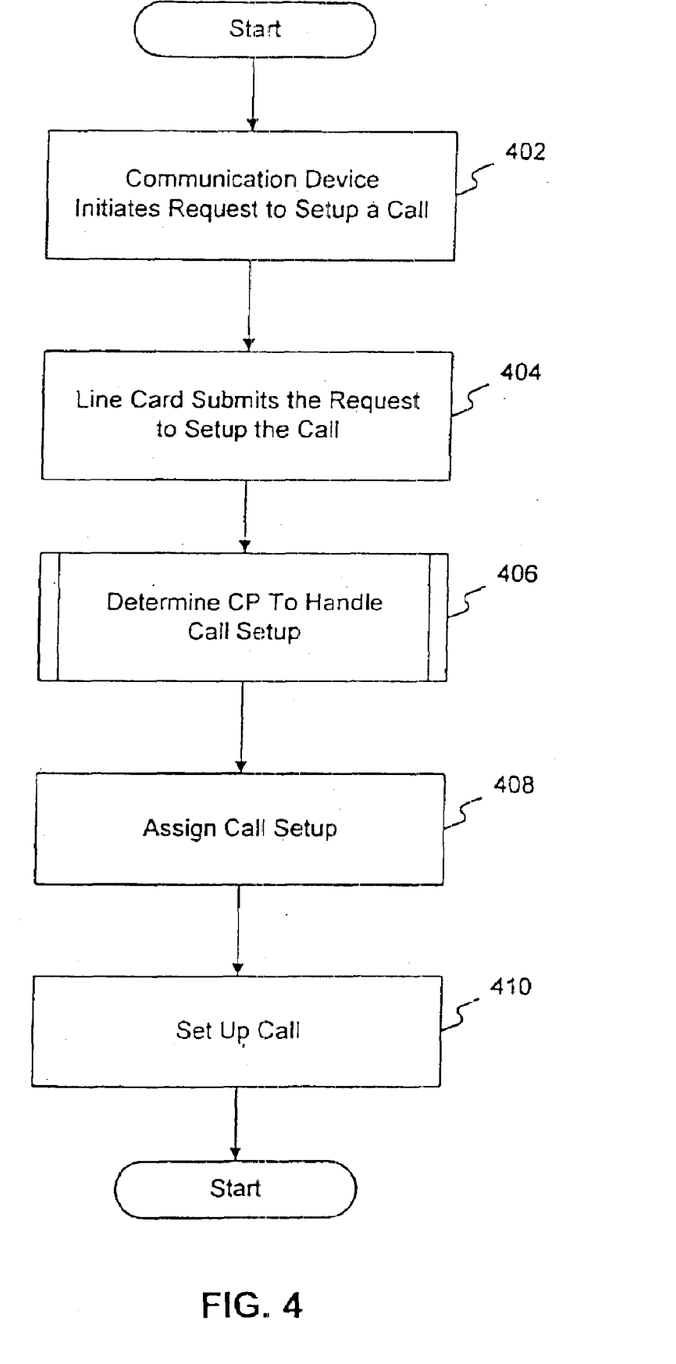
FIG. 4 is a flow chart indicating the steps, consistent with this invention, of setting up a call on a network.

FIG. 4 is a flowchart showing the steps of setting up a call consistent with this invention (step 302 on FIG. 3). Initially, a communication device initiates a request to set up a call over the network (step 402). For example, a request is made when a person takes a phone off-hook and dials a phone number. The phone number defines a specific communication device on the network. A line card connected to the communication device submits the set up request to CP's 110–116 (step 404). For example, the line card can broadcast the request to set up the call over a multicast channel to CP's 110–116. Next, the CPs receiving the request determine which CP should handle the call setup (step 406). Each CP executes a selection process consistent with the present invention to determine the CP best suited to process the call setup. This process identifies the CP capable of setting up the call based on the load of each CP on the network. The call setup is then assigned to the selected CP (step 408). This latter step is performed in a manner that ensures only one of the multiple CP units attempts to set up the call. For example, if a race condition occurs between two or more CPs then certain criteria may be used, such as the CP with the highest serial number or address, to select the CP to set up the call. The selected CP then sets up the call between the communication devices (step 410).

Figure 5:
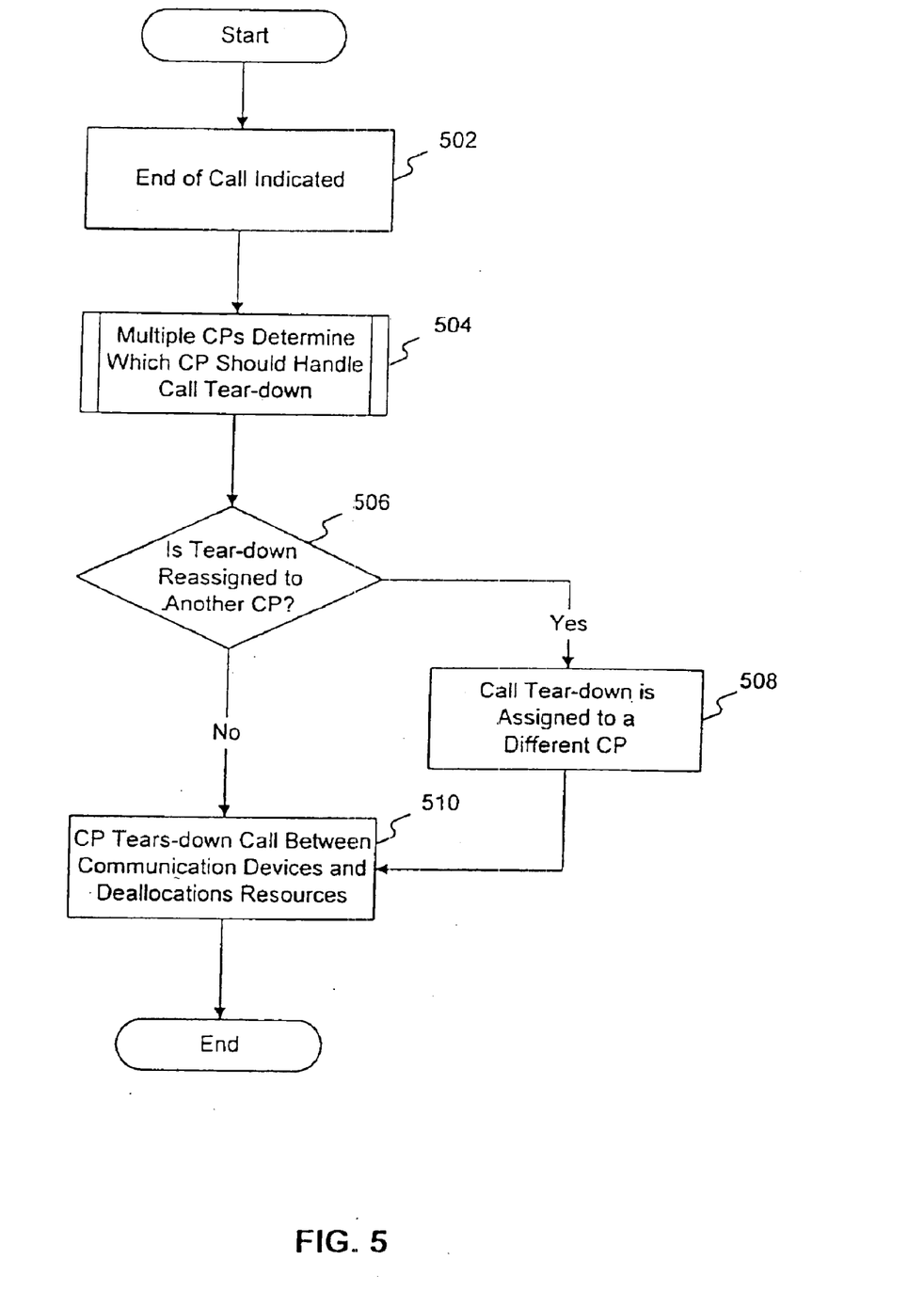
FIG. 5 is a flow chart illustrating the steps, consistent with this invention, of tearing down a call on a network.

FIG. 5 is a flowchart showing the steps associated with tearing down a call and deallocating resources associated with the call (step 306 of FIG. 3). Tear-down of a call is initiated on some indication of the end of the call (step 502). This indication may be provided in a variety of ways and may originate at either end of the call. For example, an end of call may be indicated when a person hangs up a communication device such as a phone or audio-video device. Alternatively, an end of call may be indicated when a line card failure occurs and all the calls associated with a particular line card are terminated. This indication is provided to all the CP's. The multiple CP's then determine the CP best suited for tearing down the call and deallocating the resources (step 504). This process selects a CP for tear-down based on the load distribution among the different CPs on the network. If the CP identified to tear down the call is not the same as the CP that set up the call (step 506), call tear-down is assigned to a different CP (step 508). Reassigning call tear-down may involve removing a record in the call tear-down module associated with one CP and adding the same record to a call tear-down module associated with another CP on'the network. Alternatively, if the CP that set up the call also tears down the call, no modification of the tear-down module information within the CP is generally required. In either case, only one of the multiple CP units preferably attempt to tear-down the call. The selected CP then tears down the call and deallocates resources from the call (step 510).

Figure 6:
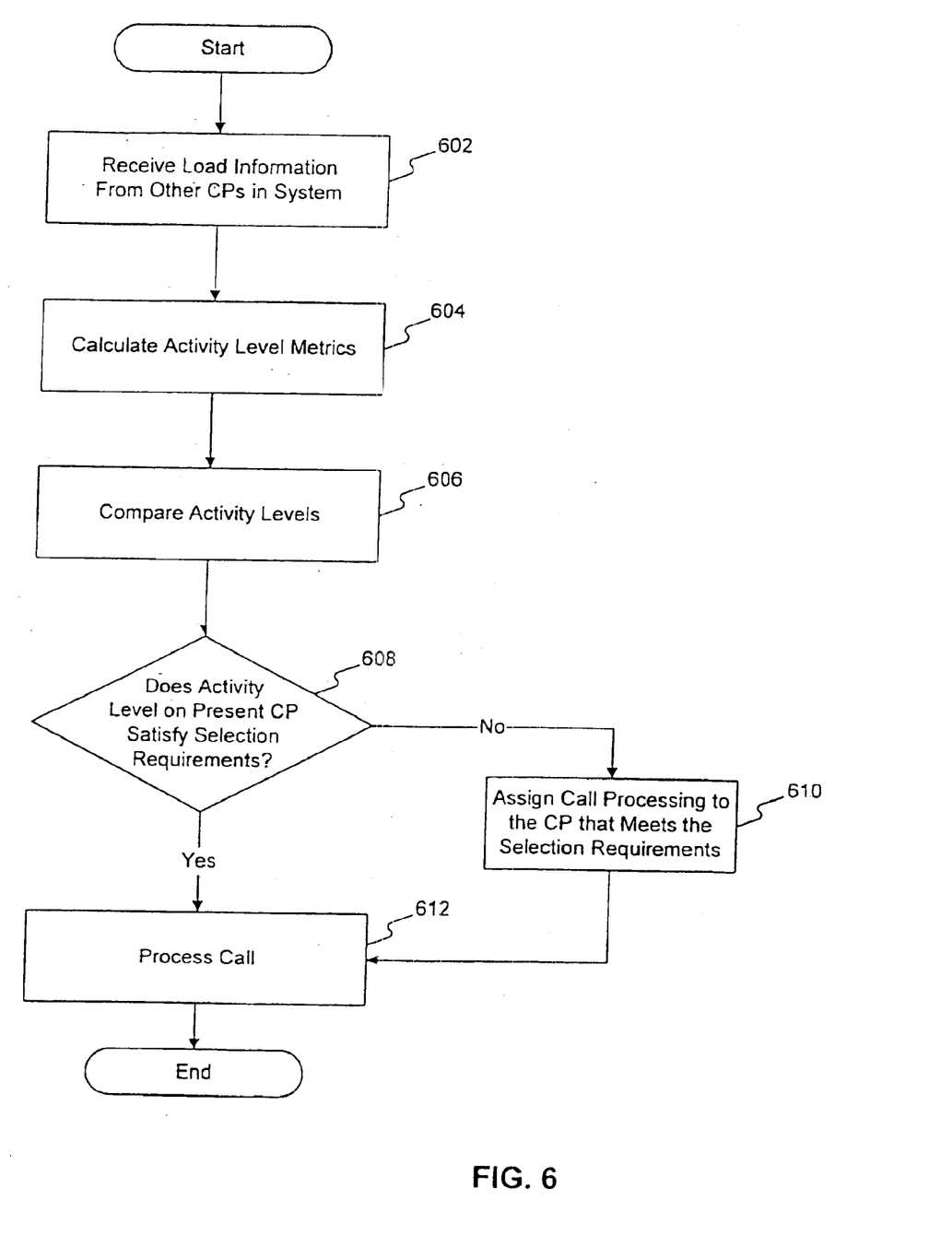
FIG. 6 is a flow chart showing the steps, consistent with this invention, of selecting a processor to process a call in a multiprocessor architecture.

FIG. 6 is a flowchart illustrating selection of a CP in a multiprocessor switched network for setting up a call (e.g., step 406 in FIG. 4) or tearing down a call (e.g., step 504 in FIG. 5). In either case, a CP is selected that is best suited for processing setup or tear-down of a call in view of the overall processing load on the multiple CP devices.

Initially, each CP receives load information broadcast by each CP in the system (step 602). For example, load information can transmitted by each CP to every other CP and updated load information can be sent at regular time periods or when requested by a CP or other device on the network. The load information is used by each CP to generate activity level metrics for the CP's in the network and line cards associated with the CP's (step 604). An activity level metric consistent with this invention is useful in selecting one of the multiple CP's to process call setup, call tear-down, or perform other call processing functions.

The activity level metric may include, for example, determining the process load associated with each of the CPs, and predicting the potential incremental increase in the process load to setup, tear down, or perform this call processing functions for a call on the network. Process load can be measured, for example, by calculating the number of calls a CP is setting up or tearing down in a given time interval as calls/second. The potential incremental increase in the process load is a measure of the prospective load if the additional set up, tear-down, or other call processing is performed. This increase may vary for each line card. For example, the incremental increase in process load on CP 116 (see FIG. 1) may be greater to set up a call for a communication device connected to line card 102 than a communication device connected to line card 108. This difference might be caused by a variety of factors, such as the difference in the geographic distance between the line card and the CP or the difference in the processing power of the line cards or other communication equipment.

In one embodiment, the process load and the incremental increase in the process load are multiplied together to form an activity level metric. In another embodiment, the activity level metric is calculated by combining these values or related values using different mathematical combinations. Any approach that establishes relative process loads would be consistent with the present invention. The activity level metric provides a variable for comparing the processing overhead for a CP in setting up, tearing down or performing other call processing functions for a call.

The activity level metric assists in delegating the processing of a call to the most suitable CP on the network. Each CP compares the activity levels for the different CPs (step 606) to select the most appropriate CP to process the call set up, tear down, or other function. For example, the selection requirements may select the CP with the lowest activity level. If the CP currently handling the call is again selected for further processing of the call, call processing is not reassigned to a different CP for the further processing (step 612). Alternatively, call processing can be assigned to a different CP that meets the selection requirements, thus allowing call set up, call tear-down, and other call processing functions to be handled on different CP devices (step 610).

Figure 7:
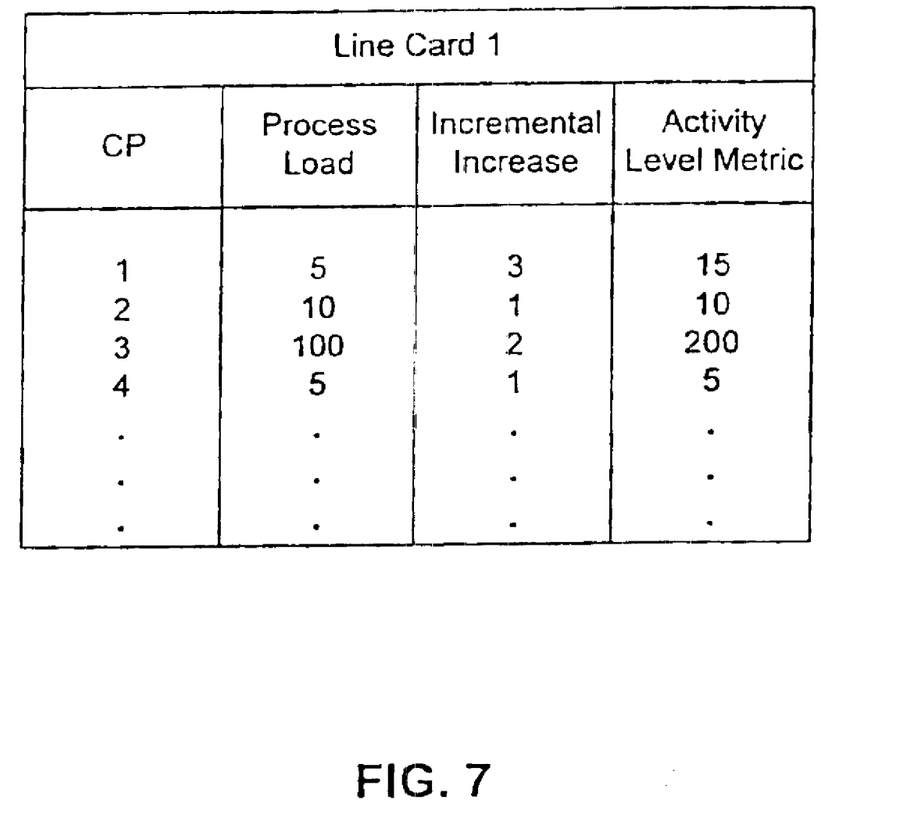
FIG. 7 illustrates an activity level table indicating the load associated with processing calls on each of the multiple call processors.

FIG. 7 is a block diagram of an embodiment of an activity level table used to store the process load, the potential incremental increase in the process load, and the activity level for each CP, for example. The activity table indicates that each CP has a different process load (e.g., calls/second) and incremental load increase for each respective line card. In this example, the activity level table depicts load information for four CPs on the network. CPs 1–4 corresponds to CP 110, CP 112, CP 114, and CP 116, respectively, in FIG. 1. According to this table, CP 2 is currently processing 10 calls per second and taking an additional call from a communication device connected to line card 1 would effectively increase the load by a multiple of 1. The activity level for CP 2 is the process load of 10 times the incremental load increase of 1 resulting in an activity level metric of 10. In contrast, CP 3 is currently processing 100 calls per second and, taking an additional call from a communication device connected to line card 1 would increase the load by 2. Using the same calculation, the activity level metric for CP 3 would be 200 to take an additional call from a communication device connected to line card 1. As previously noted, other calculation methods may be used to assess relative loading.

The information contained in an activity table may be maintained in various ways. The information may be updated periodically, for example, whenever individual activity levels are updated, based on significant changes in activity level (e.g., threshold crossing) or at some other fixed or variable interval. As with the process load information, the information contained in an activity table may be broadcast to all CPs.

While specific embodiments have been described herein for purposes of illustration, various modifications may be made without departing from the spirit and scope of the invention. For example, one implementation of the present invention can be designed to transmit packet information over an Internet Protocol (IP) network or TCP/IP network. Other implementations may use switched network protocols between the communication devices, the line cards, and the CP devices. Accordingly, the invention is not limited to the above described embodiments, but instead is defined by the appended claims and their full scope of equivalents.

What is claimed is:

1. A method for assigning a call to a call processor in a communications system having multiple call processors, comprising:

receiving a call request from a communications device;

multicasting the call request to a plurality of call processors;

selecting a one of the plurality of call processors to handle the call; and assigning call setup to the selected call processor.

2. The method in accordance with claim 1 wherein the selecting the one of the plurality of call processors further comprises:

executing a selection process at each of the plurality of call processors based upon load information of the plurality of call processors.

3. The method in accordance with claim 2 wherein the selecting the one of the plurality of call processors further comprises selecting the one of the plurality of call processors using an additional criteria when a race condition occurs.

4. The method in accordance with claim 2 wherein the selection process further comprises:

determining an activity level metric for each of the plurality of call processors.

5. The method in accordance with claim 4 wherein the determining an activity level metric for each of the plurality of call processors further comprises:

determining a process load for each call processor; and determining an incremental increase in the process load associated with setting up the call, the activity level metric being determined based on the process load and the incremental increase.

6. The method in accordance with claim 1 wherein the multicasting the call request comprises:

multicasting the call request over a multicast channel to each of the plurality of call processors.

7. An apparatus for assigning a call to a call processor in a communications system having multiple call processors, the apparatus comprising:

means for receiving a call request from a communications device;

means for multicasting the call request to a plurality of call processors;

means for selecting a one of the plurality of call processors to handle the call; and means for assigning call setup to the selected call processor.

8. The apparatus in accordance with claim 7 wherein the means for selecting the one of the plurality of call processors further comprises:

means for executing a selection process at each of the plurality of call processors based upon load information of the plurality of call processors.

9. The apparatus in accordance with claim 7 wherein the means for multicasting the call request comprises:

means for multicasting the call request over a multicast channel to each of the plurality of call processors.

10. A system for assigning a call to a call processor in a communications system having multiple call processors, the apparatus comprising:

at least one line card operable for receiving a call request from a communications device;

a plurality of call processors operatively connected to the at least one line card, each of the plurality of processors operable for receiving the call setup request from the at least one line card in response to the received call request, each call processor having a memory and instructions operable such that each of the call processors is capable of independently determining which of the call processors should be used to setup the call in response to the call setup request.

11. The apparatus in accordance with claim 10 wherein the at least one line card multicasts the call setup request to each of the plurality of call processors.

12. The apparatus in accordance with claim 11 wherein the call setup request is multicast over a multicast channel to each of the plurality of call processors.

13. The apparatus in accordance with claim 10 wherein the independent determining of which call processor should be used is further used to select one of the plurality of call processors for call setup.

14. The apparatus in accordance with claim 13 wherein the selected call processor is selected based upon load information associated with each of the call processors.

15. The apparatus in accordance with claim 14 wherein the load information for each call processor comprises an activity level metric.

16. The apparatus of claim 15 wherein the activity level metric is determined based on process load for the call processor and an incremental increase in the process load associated with setting up the call.

17. A method for assigning a call to a call processor in a communications system having multiple call processors, comprising:

transmitting load information from each one of a plurality of call processors to each other one of the plurality of call processors;

receiving a call setup request associated with the call and multicasting the call setup request to the plurality of call processors;

in response to the received call setup request, selecting a one of the plurality of call processors to handle the call based upon the load information; and assigning call setup to the selected call processor.

18. The method in accordance with claim 17 wherein the load information is transmitted periodically.

19. The method in accordance with claim 17 wherein the load information is used by each call processor to generate activity level metrics for each call processor, and wherein the activity level metrics are used in selecting the one of the plurality of call processors.

20. The method in accordance with claim 17 wherein the multicasting the call request comprises:

multicasting the call request over a multicast channel to each of the plurality of call processors.

* * * * *